United States Patent [19]

Scepanovic et al.

[11] Patent Number: 4,557,644
[45] Date of Patent: Dec. 10, 1985

[54] PORTABLE SLOTTING AND GROOVING ATTACHMENT

[76] Inventors: Vojislav Scepanovic, 2 Paytoix Ct., Brampton, Ontario L6W 3S7; Réjean Raiche, 825 Saint-Pierre St., Chambly, Province of Quebec J3L 1M3, both of Canada

[21] Appl. No.: 522,615

[22] Filed: Aug. 12, 1983

[51] Int. Cl.$^4$ .............................................. B23C 3/28
[52] U.S. Cl. .................................................. 409/143
[58] Field of Search ...................... 409/143, 144, 240; 29/27 A, 26 B

[56] References Cited

U.S. PATENT DOCUMENTS

| | | | |
|---|---|---|---|
| 824,322 | 6/1906 | Wilner et al. | 409/143 X |
| 2,372,913 | 4/1945 | Schmidt | 409/143 |
| 2,455,662 | 12/1948 | Dyer | 409/240 |
| 2,497,170 | 2/1950 | Hite | 409/240 |
| 3,158,065 | 11/1964 | Korener et al. | 409/143 |
| 4,400,859 | 8/1983 | Wotthal et al. | 409/143 |

FOREIGN PATENT DOCUMENTS

| | | | |
|---|---|---|---|
| 146353 | 9/1920 | Canada | 409/240 |
| 461965 | 12/1949 | Canada | 409/240 |
| 482252 | 4/1952 | Canada | 409/240 |

*Primary Examiner*—William R. Briggs

[57] ABSTRACT

The attachment is to be fitted to a lathe or a milling machine. It is designed for slotting (keyway cutting) and grooving operations. It comprises an elongated boxshape housing having a longitudinally extending shaft journaled therein. The rear end of the shaft is operatively connected to an electric motor, while the front end carries a first bevel gear which meshes with a second bevel gear fixed to a hollow spindle and perpendicular thereto journaled in the front end of the housing. A rotary cutting tool is removably fixed within the spindle and projects laterally of the housing. The attachment can be detachably secured to the carriage of a lathe or to the head portion of a milling machine.

2 Claims, 8 Drawing Figures

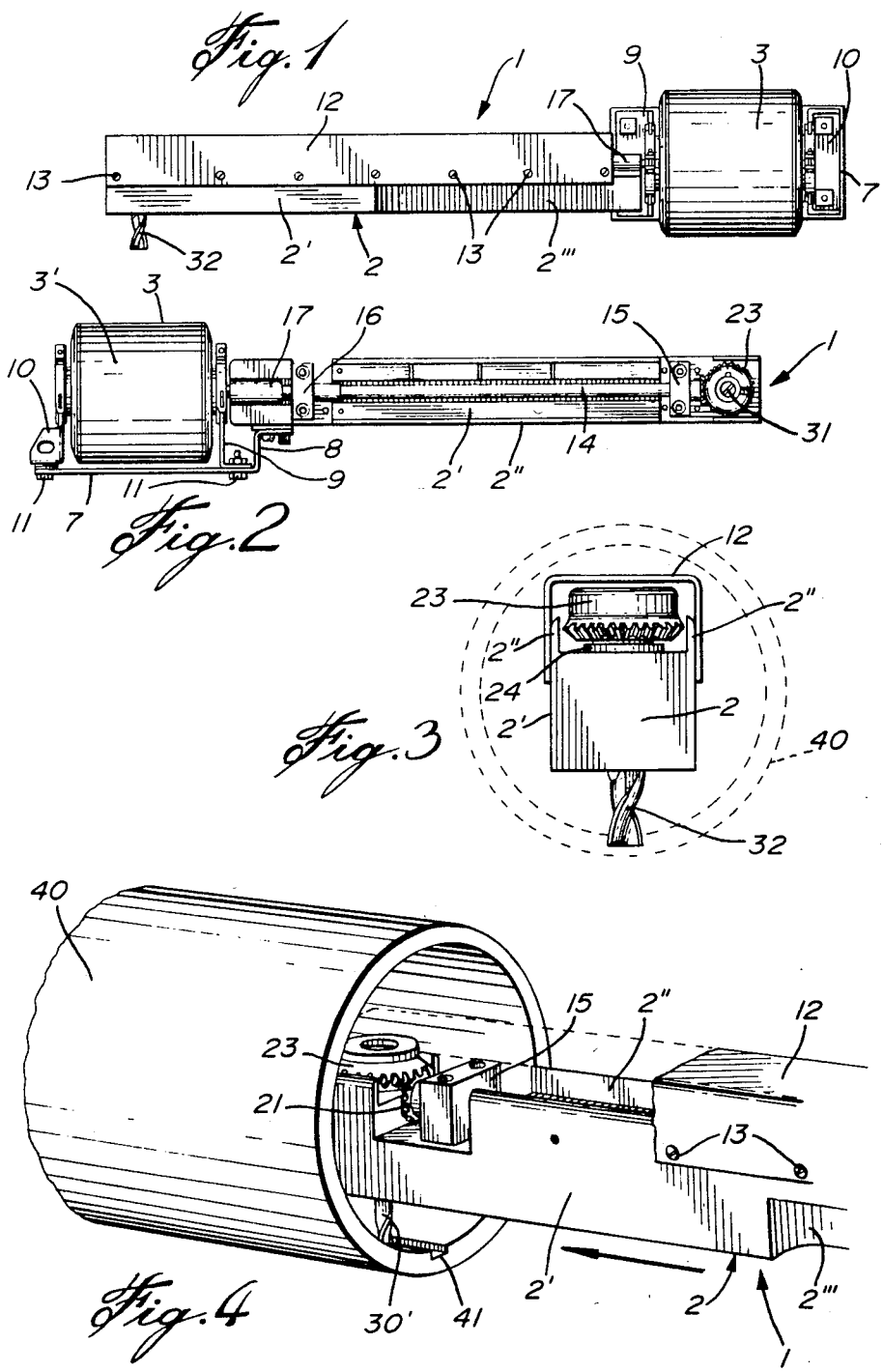

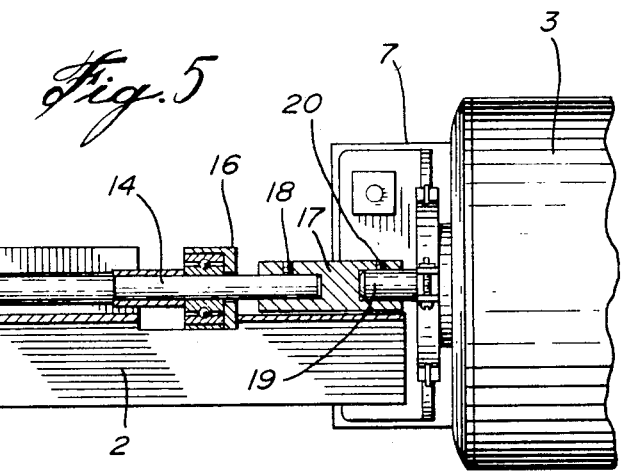
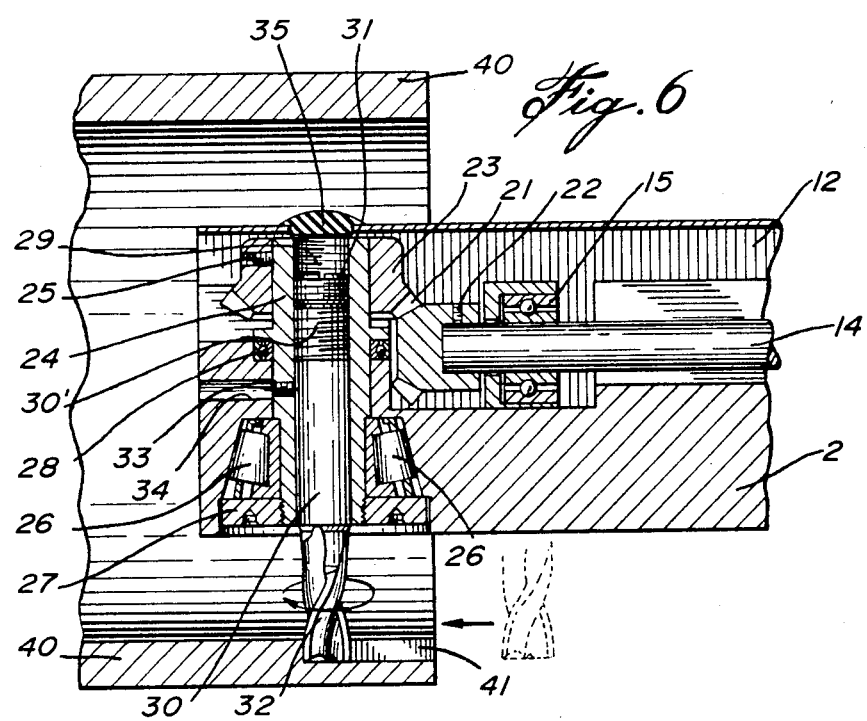

PORTABLE SLOTTING AND GROOVING ATTACHMENT

FIELD OF THE INVENTION

The present invention relates generally to lathes and milling machines, more specifically to an improved attachment removably mounted on such machines.

BACKGROUND OF THE INVENTION

Lathes and milling machines are used for cutting external keyways and screw or drill threads, facing and boring operations, straight and taper milling etc., on a workpiece held in the machine.

However the only known machine able to cut internal keyways, whether straight or of progressive depth is a type of reciprocating chisel which cuts bit by bit while moving along the workpiece. Moreover this machine is very expensive and must be properly centered relative to the workpiece.

OBJECTS OF THE INVENTION

Accordingly a prime object of the present invention is to provide a machine which can easily and precisely cut an internal as well as an external keyway in a workpiece as well as spiral or circular grooves, external or internal.

Another important object of the invention is to provide a machine of the above type which is portable and which can be removably secured to a conventional lathe or milling machine.

It is yet another object of the invention to provide a machine of the above type which has its own power source, can be handled as one unit and which operates in a fast manner.

SUMMARY OF THE INVENTION

The above and other objects and advantages of the present invention are realized according to a preferred embodiment comprising an elongated and generally box-shape housing provided with mounting means for removable attachment to the carriage of a conventional lathe or to the head portion of a conventional milling machine. A longitudinally extending drive shaft is journaled within the housing.

One end of the drive shaft is operatively connected to the output shaft of a power source, such as, for example, an electric motor, said power source being carried by one end portion of said housing.

The opposite end of the drive shaft drives a tool carrier consisting of a hollow spindle extending normal to the shaft and housing and adapted to receive and drive a rotary cutting tool projecting laterally from the second end portion of the housing. Fixing means are provided to removably and rigidly secure the tool within the drive spindle.

If a lathe is being used, the work is secured to the headstock and extends longitudinally rearwardly therefrom such that its end is proximate the carriage. The work may thus be rotated or not. If the work is stationary the invention can be used to cut an internal slot or keyway. If the work is made to turn, a spiral or circular internal (as well as external) groove can be cut. Similarly the attachment of the invention can be mounted on the head portion of a milling machine, as is sometimes needed for larger work.

BRIEF DESCRIPTION OF THE DRAWINGS

The above will be more clearly understood by having referral to the preferred embodiment, illustrated by way of the accompanying drawings in which:

FIG. 1 is a side elevation of the attachment according to the invention;

FIG. 2 is a top plan view, without the housing cover, of the attachment;

FIG. 3 is a forward end elevation of the attachment also showing work in dashed outline;

FIG. 4 is a perspective view of the attachment cutting an internal slot in a workpiece;

FIG. 5 is a side elevation of the rear end portion of the attachment, partly sectioned;

FIG. 6 is a longitudinal section of the forward end of the attachment and a portion of a workpiece being cut;

Like numerals refer to like elements throughout the drawings.

DETAILED DESCRIPTION OF THE PREFERRED EMBODIMENT

Figure 7:
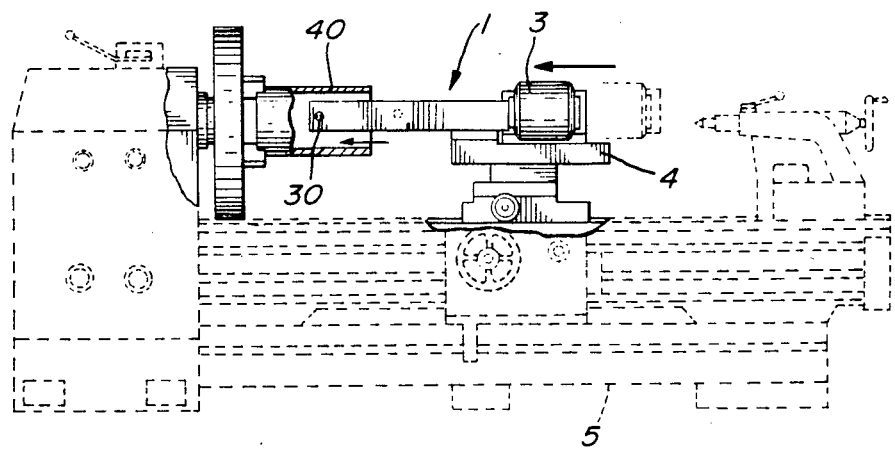
FIG. 7 is a side elevation of a lathe partly in dotted lines showing the attachment mounted on the carriage thereof.
Figure 8:
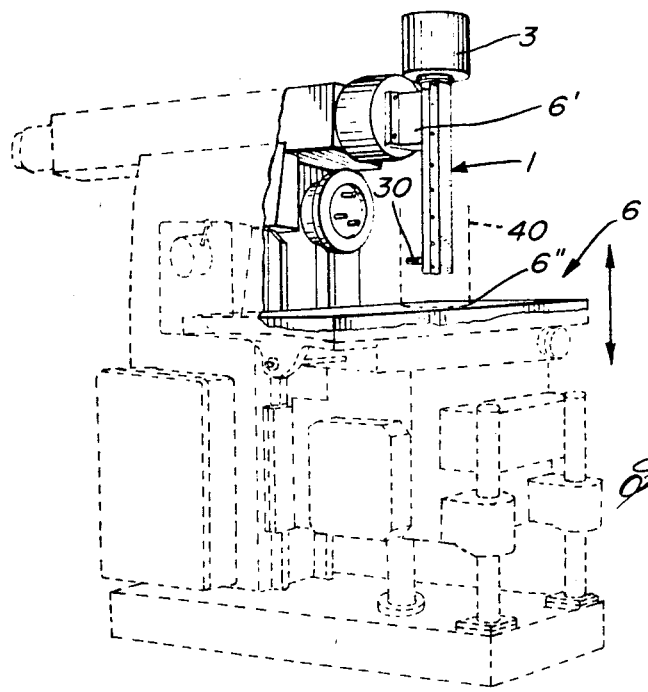
FIG. 8 is a perspective view of a milling machine partly in dotted lines with the attachment mounted thereon.

Referring to FIGS. 1, 2, 7 and 8 there is shown the attachment 1 consisting of an elongated box-shape housing 2 including a solid bar like portion 2' with spaced parallel flanges 2''. An independent power source such as an electric motor 3 is fixed to the housing 2 at the rear end thereof. The rear end portion 2''' of bar 2' is of reduced thickness, as shown in FIGS. 1 and 2, and by a suitable bracket conventional tool holder is adapted to be removably secured, for example, to the carriage 4 of a lathe 5 (FIG. 7) or the head portion 6' of a milling machine 6 (FIG. 8), after removal of the part carrying the vertical spindle of said machine. The motor 3 is fixed to a plate 7 by brackets 9, 10 and bolts 11, and plate 7 has an L-shape extension 8 fixed to the rear end of bar 2'.

Housing 2 preferably has a removable top, cross-sectionally U-shape, cover 12 secured by screws 13 to flanges 2'' as seen clearly in FIGS. 1 and 4.

Housing 2 carries a rotatable drive shaft 14 which is journaled at both its front and rear end portions in ball bearing assemblies 15 and 16 respectively.

The rear end of shaft 14 is rigidly secured in a connector element 17 by a set screw 18 as is the output shaft 19 of motor 3 by another set screw 20 thereby causing shaft 14 to rotate bodily with output shaft 19.

The front end of drive shaft 14 is provided with a first gear means constituted by a bevel gear 21 rigidly fixed to the shaft by a set screw 22.

Referring now to FIG. 6 there is shown the working elements of attachment 1. These elements include a second gear means constituted by a second bevel gear 23 rigidly secured to a drive spindle 24 by a set screw 25. Gear 23 meshes with gear 21.

Drive spindle 24 is journaled within the front end of housing 2 by means of tapered roller bearings 26 and ball bearings 28. The assembly is retained in position by a collar 27 screwed onto the outer end of spindle 24.

Spindle 24 has an axial bore which is threaded in its portion surrounded by gear 23, as shown at 29. A standard rotary cutting tool 30 is removably inserted in the bore of spindle 24. The threaded end 30' of the shank of tool 30 is screwed in the threads 29 of spindle 24 and locked by a lock screw 31. The cutting end portion 32 of tool 30 projects laterally of housing 2.

A second lock means is provided to positively prevent tool 30 from loosening relative to the drive spindle 24 during operation. This lock means comprises a set screw 33 laterally engaging the shank of tool 30 and accessible through an end bore 34 made in bar 2'. A cap 35 removably closes an opening made in cover 12 to gain access to lock screw 31.

FIGS. 3, 4 and 6 to 8 show one of the operations that can be carried out by attachment 1 when mounted horizontally on the carriage 4 of a lathe 5 or vertically on head portion 6' of milling machine. A workpiece, consisting of a pipe 40, is fixed to the headstock of the lathe or to table 6" of milling machine 6. Cutting tool 30 is in the process of cutting an internal slot of keyway 41 in pipe 40, the headstock or table 6" being stationary.

It will be readily grasped that, if the lathe carriage or the table 6" is moved transversely of the workpiece cutting, a keyway of progressive depth or shallowness can be easily executed. On the other hand, if pipe 40 is made to rotate, a spiral groove or a circular groove can just as easily be cut by, for instance, rotating the headstock and making the carriage 4 of lathe 5 move towards the headstock or remain stationary respectively.

What we claim is:

1. An attachment for a lathe or milling machine comprising: an elongated solid bar, with longitudinally-extending spaced parallel flanges, and a rear end portion of reduced thickness adapted to be detachably secured by the tool holder of the carriage of said lathe or of the head portion of said milling machine; a driving motor secured to the rear end of said bar and having an output shaft; a longitudinally-extending drive shaft rotatably carried by said bar and having a rear end operatively connected to the said output shaft, and extending between said flanges; a first bevel gear rigidly secured to the forward end of said drive shaft; a second bevel gear operatively meshing with said first bevel gear; a drive spindle secured to said second bevel gear and journaled in the forward end of said bar, said spindle being normal to said drive shaft and having an axial bore opening laterally out of said bar, said spindle bore having an internal threading constituting means to secure within said bore the engageable threaded shank of a rotary cutting tool, with the cutting portion of said tool projecting laterally of said bar; and a lock screw, also threadedly engaged in said internal threading, and rigidly abutting the end of said tool shank.

2. The attachment of claim 1, further including a cover for said shaft and fixed to said flanges, to form a box-shaped housing with said bar; and a cap removably closing a hole in said cover in registry with said lockscrew.

* * * * *